April 7, 1931.  W. SEIPEL  1,799,872
LIQUID BRAKE
Filed Aug. 18, 1928
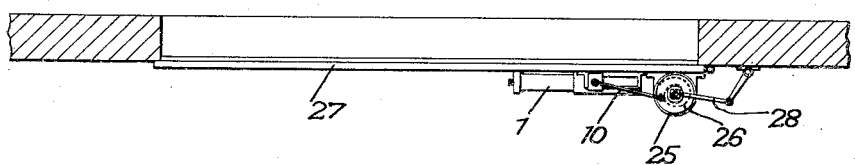
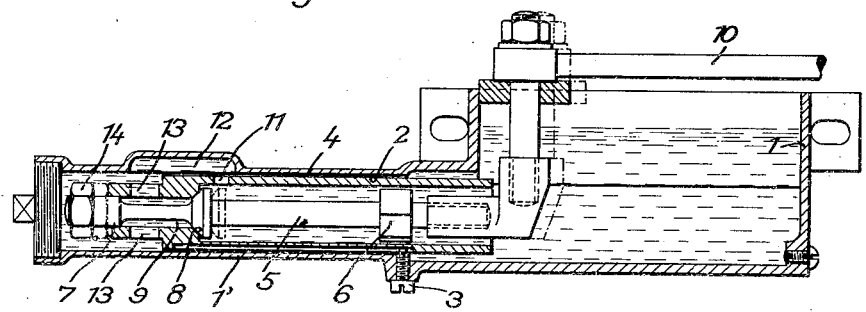
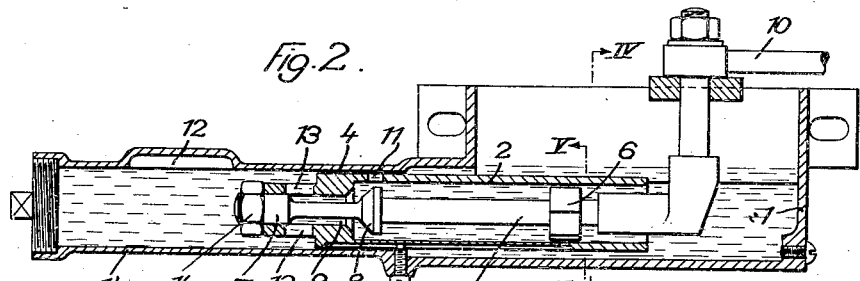
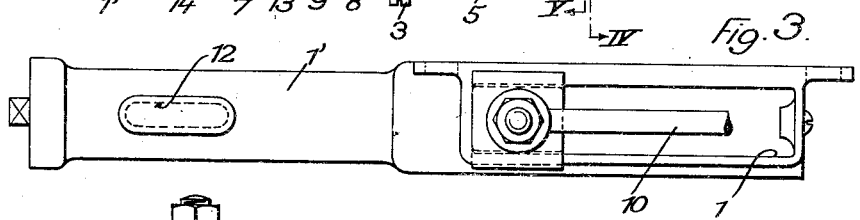
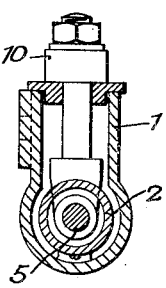
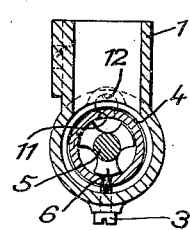
Inventor:
Wilhelm Seipel,
By Henry Orth Jr
Atty Patented Apr. 7, 1931

1,799,872

UNITED STATES PATENT OFFICE

WILHELM SEIPEL, OF HERISAU, SWITZERLAND

LIQUID BRAKE

Application filed August 18, 1928, Serial No. 300,579, and in Switzerland August 23, 1927.

The subject matter of the present invention is a liquid brake having a piston so arranged in a casing containing liquid that during a displacement of the piston the liquid flows slowly between the piston and the casing and causes thereby a braking effect.

Preferably an automatically controlled valve is provided in the piston which opens when the piston is displaced in one direction whereby the liquid may quickly pass through the piston during said movement of the latter.

Construction examples of the subject matter of the present invention are illustrated on the accompanying drawings, in which:

Fig. 1 is an axial section of a first constructional example serving as a door closing device, Fig. 2 is a section similar to that in Fig. 1 but showing the piston in a different position, Fig. 3 is a plan view of Fig. 1, Figs. 4 and 5 are cross-sections along lines IV—IV and V—V respectively in Fig. 2, Fig. 6 shows in a plan view the brake arranged as a door closer;

Referring now to the constructional example illustrated in Figs. 1-6 of the drawings, 1 denotes the casing adapted to be fixed to a door and filled with a liquid, for instance glycerine, and enclosing the tubular piston 2 guided in the cylindrical portion 1' of the casing, a small annular clearance 4 being provided between the piston 2 and the cylindrical portion 1'; a set screw 3 projects into a longitudinal groove of the piston 2 to prevent a turning of the latter. A rod 5 passes through the piston 2 and is guided in the latter by its enlarged portions 6 and 7 and a valve cone 8 of the rod 5 cooperates with an aperture 9 of the piston 2 for closing said aperture. The rod 5 is connected by means of link 10 and a casing 25 to one end of a spiral spring 26 which, in a known manner and as is shown in Fig. 6 is fixed to the door 27 and serves to shut the latter. Further levers 28 connect the end of the spiral spring to the frame of the door so that in a known manner the spiral spring 26 is tensioned when the door is opened and causes thereupon the closing of the door.

The piston 2 is provided with a lateral hole 11 by means of which it is in connection with a bye-pass 12 for the braking liquid, said bye-pass 12 being provided in the cylindrical casing portion 1'.

On opening the door first of all the rod 5 is longitudinally displaced in the piston 2 (Fig. 1) by the link 10 so that the valve 8 is opened, whereby the passage 9 in the piston is opened and braking liquid is permitted to flow through the piston 2 and lateral openings 13, provided in the end part of the piston, into the cylindrical portion 1' of the casing; thus no appreciable resistance is opposed to the opening of the door by the hydraulic braking device of the door closer. After the rod 5 has been displaced by a definite amount an abutment nut 14 on the rod bears on the end of the piston 2 and causes the latter to follow the displacement movement of the rod 5.

When the opened door is released the link 10 causes first of all a displacement of the rod 5 relatively to the piston 2, whereby the valve 8 closes the passage 9 and during the further return movement the rod 5 pushes the piston 2. The liquid which has accumulated during the opening of the door in the free space of the part 1' of the cylinder can now only slowly escape through the annular space 4 present between the piston 2 and the cylindrical casing 1' whereby the movement of the piston 2 and thereby the closing movement of the door caused by the spiral spring is braked. Shortly before the end of the stroke of the piston 2 the lateral aperture 11 is opposite the bye-pass 12 so that the braking liquid can now suddenly be displaced and flow through the piston. In consequence of this sudden reduction in the resistance of the braking liquid against the displacement movement of the piston 2 the closing movement of the door is accelerated by the action of the spiral spring, i. e. the door is pushed by a more powerful movement to snap in its lock. The movable members of the hydraulic braking device are then again in the position illustrated in Fig. 1.

The above described door closer is absolutely reliable even after long service as it has no parts subjected to a pronounced wear and does not require any attendance.

I claim:

1. In liquid brakes, a casing containing a liquid, a hollow piston therein having clearance and an aperture in its end and in its side, a rod passing through the piston, a valve on the rod to close the aperture in the piston end, a by-pass in the casing with which the side aperture of the piston registers during an end portion of the piston travel, an abutment on the end of the rod beyond the piston end, and lateral openings in the piston between the valve and abutment.

2. In a liquid brake, a casing containing a liquid, a hollow piston therein having clearance and an aperture in its end and side, means to limit the to and fro movement of the piston, a rod passing through the piston, a valve on the rod to close the aperture in the piston end, a by-pass in the casing with which the side aperture in the piston registers during a portion of the piston travel, an abutment on the end of the rod beyond the piston end to permit limited movement of the rod with respect to the piston and lateral openings in the piston end between the valve and abutment.

In testimony whereof I have signed my name to this specification.

WILHELM SEIPEL.